Sept. 1, 1931. T. A. BRYSON ET AL Re. 18,174

CENTRIFUGAL EXTRACTOR

Original Filed May 15, 1924 4 Sheets-Sheet 1

INVENTORS:
T. A. Bryson and F. I. Williams
BY
John D. Morgan
ATTORNEY

Sept. 1, 1931. T. A. BRYSON ET AL Re. 18,174

CENTRIFUGAL EXTRACTOR

Original Filed May 15, 1924 4 Sheets-Sheet 2

INVENTORS:
T. A. Bryson and F. I. Williams
BY
John D Morgan
ATTORNEY

Sept. 1, 1931. T. A. BRYSON ET AL Re. 18,174

CENTRIFUGAL EXTRACTOR

Original Filed May 15, 1924 4 Sheets-Sheet 3

INVENTORS:
T. A. Bryson and F. I. Williams
BY
John T. Morgan
ATTORNEY

Sept. 1, 1931. T. A. BRYSON ET AL Re. 18,174

CENTRIFUGAL EXTRACTOR

Original Filed May 15, 1924 4 Sheets-Sheet 4

INVENTORS:
T. A. Bryson and F. I. Williams
BY
John D. Morgan
ATTORNEY

Reissued Sept. 1, 1931 Re. 18,174

UNITED STATES PATENT OFFICE

TANDY A. BRYSON AND FRANK I. WILLIAMS, OF TROY, NEW YORK, ASSIGNORS TO TOLHURST MACHINE WORKS, INC., A CORPORATION OF NEW YORK

CENTRIFUGAL EXTRACTOR

Original No. 1,640,978, dated August 30, 1927, Serial No. 713,468, filed May 15, 1924. Application for reissue filed August 22, 1929. Serial No. 387,775.

The invention relates to safety devices for centrifugal extractors, and more particularly to a novel form of mechanism for preventing the starting of the machine until the cover is closed and for preventing the opening of the cover until the basket is absolutely at rest.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1:
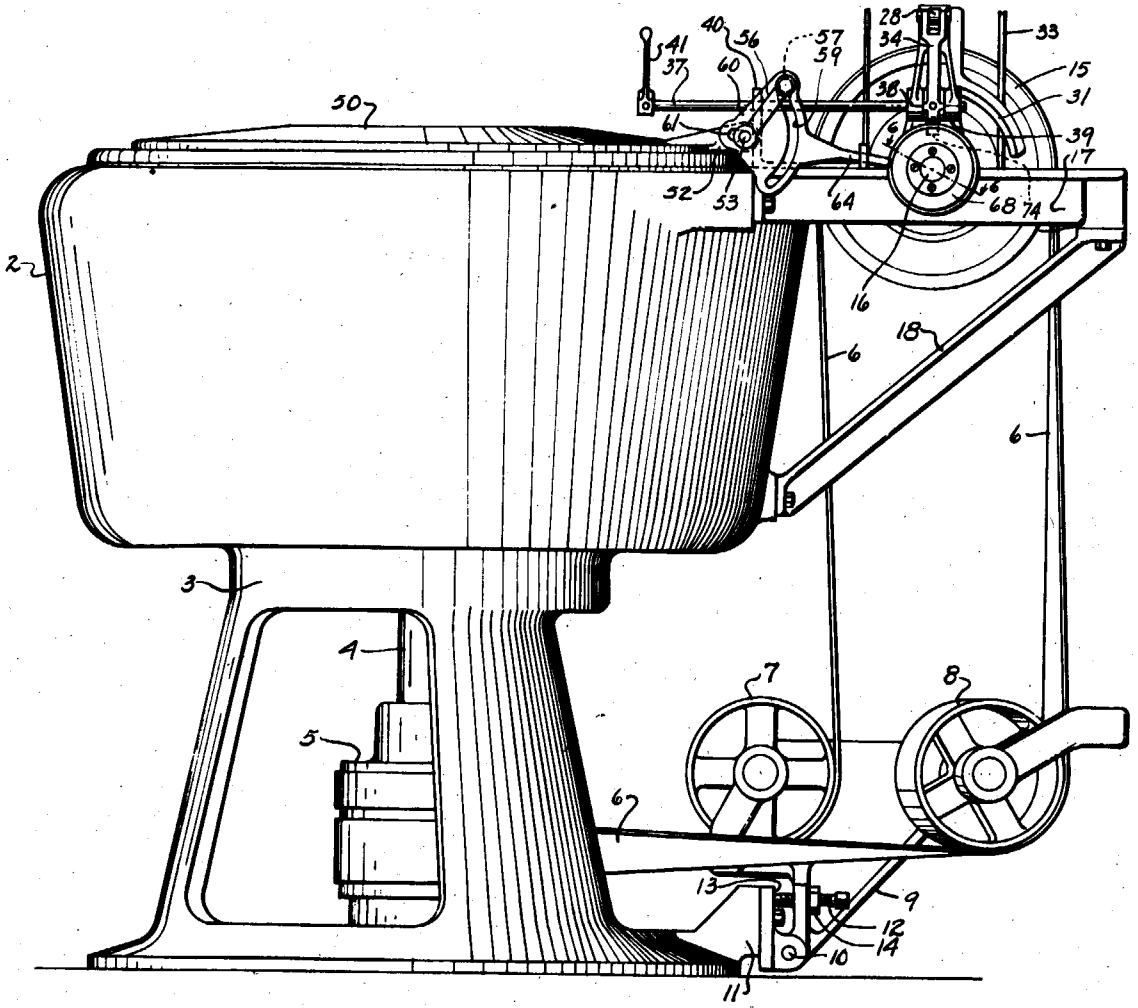
Fig. 1 is a side elevation of a machine embodying the invention.

The invention is directed to a novel, simple and very efficient safety mechanism for centrifugal machines, which prevents starting of the machine while the cover is open and prevents opening of the cover until the machine has come absolutely to rest. Furthermore, the safety mechanism, in its preferred form, comprises members co-operating or interlocking directly together, one of which is movable directly with the basket cover and the other directly with the basket driving shaft.

The member movable with the driving shaft must be given rotation relatively to the driving shaft and in the driving direction before the basket cover can be opened. This insures that the cover cannot be opened until the shaft is at rest, as practical experience has shown it to be physically impossible to so rotate the member while the shaft is still rotating. This produces an exceedingly simple, reliable and "fool-proof" safety locking means for the cover and the power.

Referring now in detail to the embodiment of the invention illustrated by way of example in the accompanying drawings, the invention is applied to an underdriven, belt-driven centrifugal. The basket (not shown), which may be of any usual or suitable kind, is enclosed in a casing 2, which is supported on a hollow base 3. The basket shaft 4 is carried in a suitable bearing (not shown) and projects downwardly within the base 3.

A belt pulley 5 is fixed on the shaft 4 and a driving belt 6 runs thereover. The belt 6 runs over suitable guiding pulleys 7 and 8, journaled respectively upon a supporting bracket 9. The bracket 9 is preferably designed and mounted to take up slack in the belt and for this purpose it is pivotally mounted at 10 upon a bracket 11, fixed to or integral with the base portion of the pedestal 3. The positioning means for the bracket 9 and its belt pulleys 7 and 8 comprises a screw 12, screw-threaded into a flange on the bracket 9, and having its point bearing upon a face 13 on the bracket 11. The screw is preferably provided with a locking nut 14.

The belt 6 runs over a driven pulley 15, fixed on a shaft 16 which is journaled in the horizontally disposed, U-shaped frame 17, which projects rearwardly horizontally from the casing 2, to which it is bolted. There is preferably provided also a supporting stay 18, bolted at its top end to the outer transverse part of the frame 17 and at its bottom end to the lower part of the casing 2. Fixed to shaft 16 is a fast pulley 19 and journaled loosely thereon is a loose pulley 20.

A suitable belt shifter is provided, and as embodied, it comprises a horizontally-disposed rod 28, longitudinally slidable in apertures in supports 29 and 30, which supports are mounted upon, and project upwardly from, the frame 17. Two belt-engaging fingers 31 and 32 project downwardly from the rod 28 to engage with, and to shift, the belt 33 in the usual manner. The actuating means for the rod 28 comprises an arm 34 having a pin-and-slot connection 35 with one end of the rod 28.

The arm 34 is fixed on a shaft 37, which shaft is journaled in bearings 38 and 39, formed on one side of the support 29, and is also journaled in a bracket arm 40, fixed to one of the side reaches of the frame 17. The shaft 37 has an actuating arm 41 fixed thereto, whereby the shaft may be rocked and the belt be thereby shifted to and fro between the fast and loose pulleys in the usual manner.

Means are provided by the invention whereby co-operating and interlocking devices, mounted directly on the driving shaft, and connected to and moving with, the safety cover prevent the throwing on of the power, and thereby starting the basket into rotation, until the safety cover is closed, and also prevent the opening of the cover until the shaft has come absolutely to rest.

As embodied, the safety cover 50 has brackets 51 and 52 extending therefrom and fixed to a shaft 53, which is journaled at 54 and 55 in brackets fixed on the casing 2. The shaft 53 extends outwardly at one end, and has fixed to its outer end an arm 56. The arm 56 has fixed to its outer end an inwardly-extending pin 57, which pin works in a slot 59 formed in a cam plate 60. The cam plate 60 is mounted on shaft 53 by means of an elongated slot 61 through which the shaft 53 passes, whereby the cam plate has radial or substantially radial movement relative to the shaft 53.

Cam plate 60 has a safety finger 64 projecting outwardly therefrom, this finger being also reciprocably mounted in an aperture in a guiding and supporting bracket 65, carried on a side reach of the frame 17. The slot 59 in cam plate 60 is shaped (Figs. 1 and 4) so that the finger 64 will be moved to and fro approximately radially with reference to the shaft 53 as the safety cover 50 is raised and lowered, and also so that the entire movement in one direction occurs at the beginning of the opening movement of the safety cover and the entire movement in the opposite direction occurs at the end of the closing movement of the safety cover. That is, the safety finger 64 will be moved to the non-running position immediately that the opening of the safety cover is begun, and will remain at that position until just as the safety cover is completely closed. The machine must be stopped and part 68 must be in proper position before safety finger 64 can be moved, or, rather, before the safety-cover can be raised.

The devices mounted upon the driving shaft 16 cooperating with the devices just described, comprise a locking sleeve 68, having an outer part 69 of lesser diameter and an inner part 70 of greater diameter, adapted to pass alternatively into line with finger 64 to permit or prevent movement thereof. The sleeve is preferably provided with a flange 71 on the inner face thereof. The locking sleeve is loosely mounted on the driving shaft 16 so as to have relative movement both along and about the shaft, to move the locking sleeve into and out of locking position with respect to the finger 64.

The connections between the sleeve and shaft are such that the locking sleeve must be rotated relatively to the driving shaft 16 in the direction of driving rotation of the shaft in order to move the sleeve from the safety locking position to the unlocking position. As embodied, said means comprises a pin 72 fixed in shaft 16 and projecting into an inclined or helical slot 73, formed in the inner cylindrical face of the locking sleeve 68. The direction of inclination of the slot 73 is such that when it is rotated in the direction of rotation of the shaft 16, the safety sleeve will move inwardly along the shaft from the safety interlocking position to the non-running position, or interlocking position.

Means are provided by the invention for insuring the interlocking action, and as embodied, said means are constructed and arranged so that the safety sleeve 68 is moved to the interlocking position whenever the belt is thrown on. In the embodied form thereof, an arm 74 is fixed on shaft 37 (Fig. 5) so that as the belt is thrown on, the safety sleeve 68 will be moved to the safety interlocking position.

The operation of the mechanism just described is substantially as follows:—

Figure 3:
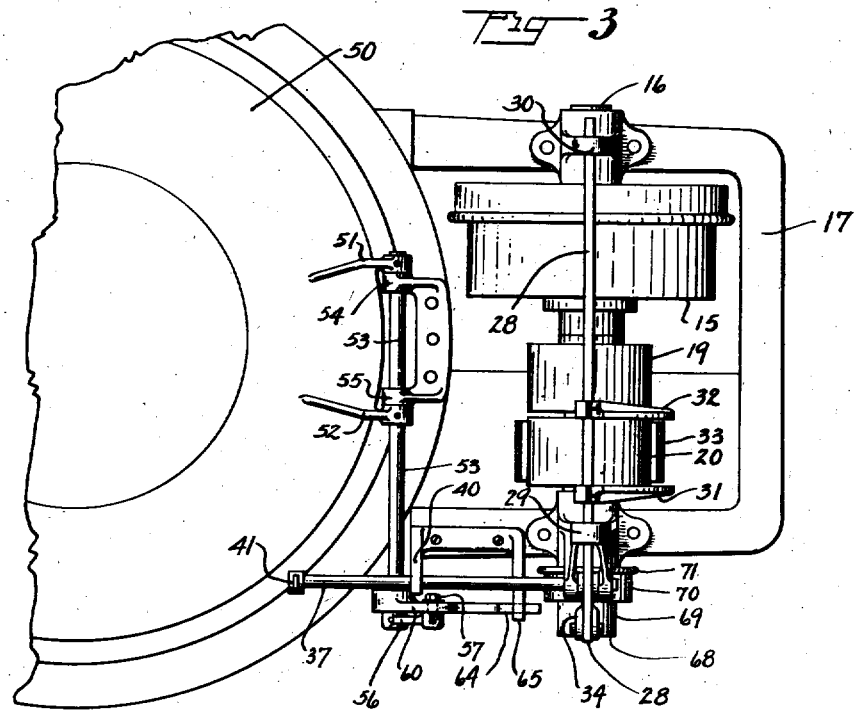
Fig. 3 is a fragmentary top plan corresponding to the right hand part of Fig. 2, but with the safety mechanism in a different position.
Figure 4:
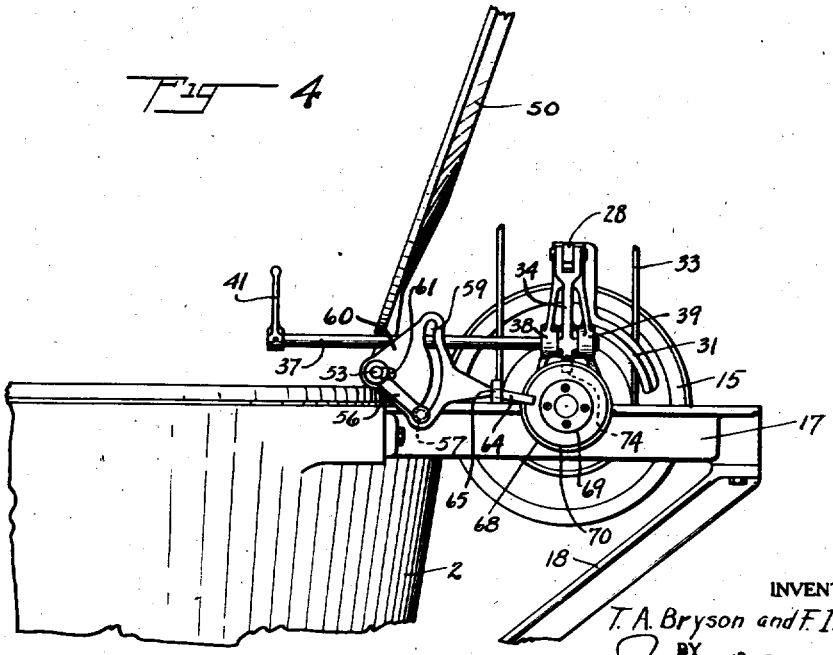
Fig. 4 is a fragmentary elevation corresponding to the upper right hand part of Fig. 1, but with the safety mechanism in a different position.

The safety cover 50 may be regarded as in the raised or open position of Fig. 4 so that the basket may be loaded. It will be remembered that when the safety cover 50 is opened, the safety locking sleeve 68 must be in the inner position on shaft 16, and that it can be moved inwardly along shaft 16 to this position (shown in Figs. 3 and 4) only when shaft 16 is at rest.

When safety cover 50 is open, arm 56 is in the lower part of slot 59 (as shown in Fig. 4), and finger 64 is in its extreme outward position in line with the flat side face of the enlarged part 70 of the safety sleeve. The finger thereby prevents the sleeve being moved to the running position, and thus prevents the slipping of the belt from the loose to the fast pulley so long as the safety cover is open. That is finger 64 (Fig. 5) prevents safety sleeve 68 being moved outwardly on shaft 16, and the belt cannot be shifted from the loose to the fast pulley unless arm 74 so moves safety sleeve 68.

When the safety cover is closed by the attendant, arm 56 is thereby swung along slot 59, which for the greater portion of its length is concentric with the arm 56, so that there is no motion of the cam plate 60 or of the safety finger 64. Just as the cover 50 is about to close the pin 57 reaches the upper, outwardly curved part of the cam slot 59 (Fig. 4), and thereby safety finger 64 is retracted out of the path of movement of the safety locking sleeve 68 just as the cover 50 closes.

Figure 2:
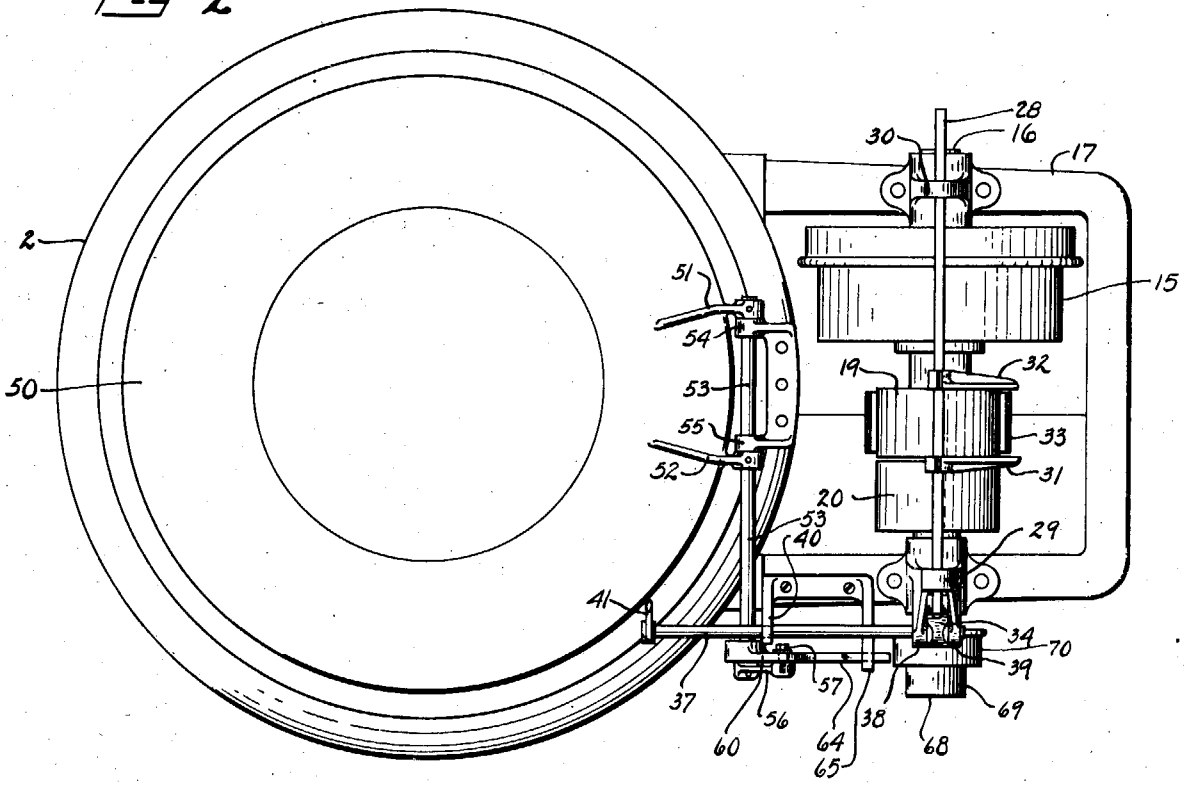
Fig. 2 is a top plan corresponding to Fig. 1.
Figure 5:
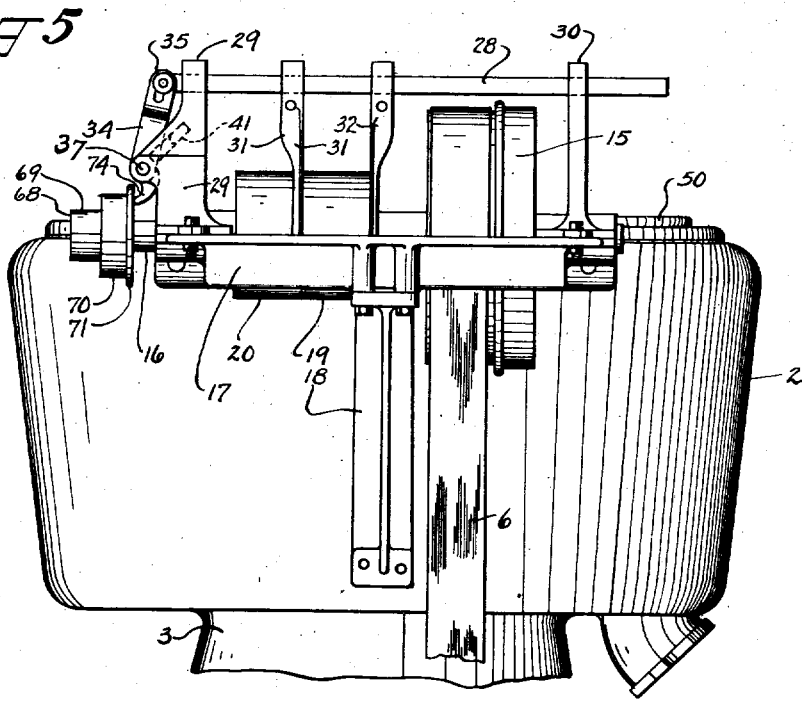
Fig. 5 is a fragmentary elevation looking at Figs. 1 and 2 from the right.
Figure 6:
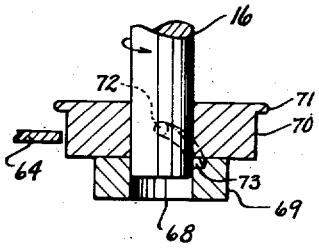
Fig. 6 is a fragmentary detail section taken substantially on the line 6—6 of Fig. 1, showing the safety device in the running position.
Figure 7:
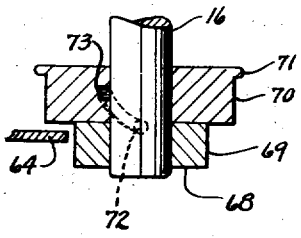
Fig. 7 is a similar view to Fig. 6, but showing the safety device in the non-running position.
Figure 8:
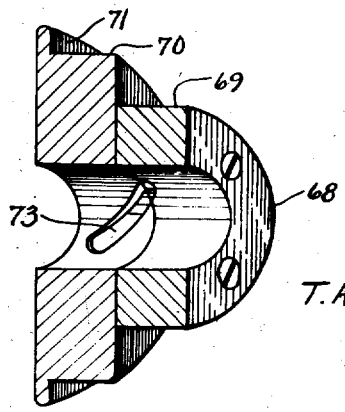
Fig. 8 is an enlarged, sectional perspective view of a portion of the safety sleeve.

The belt shifting lever 41 may now be rocked by hand, and thereby the bar 28 is moved longitudinally from left to right in Fig. 5, and the belt is shifted from loose pulley 20 to fast pulley 19 and the basket begins to rotate. By this same movement, the safety-locking sleeve 68 is moved outwardly along shaft 16, from the position of Fig. 3 to that of Figs. 1 and 2, and the enlarged peripheral part 70 of the safety locking sleeve is moved into the path of the safety finger 64. Outward movement of the finger 64 is thereby prevented, and this prevents opening of the safety cover 50. This safety interlocking condition continues so long as shaft 16 continues to rotate, for the reason that safety sleeve 68 can be moved back to a position permitting movement of finger 64 only by being rotated by hand about shaft 16 in the direction of rotation of the shaft, and this is impossible until shaft 16 comes to rest.

When the belt is shifted again to the loose pulley, the basket does not necessarily come instantly to rest. The mechanism, however, will not permit the opening of the cover until the shaft 16 and the basket have come to a full stop. This is due to the fact, just above stated, that to move the safety-locking sleeve from the interlocking position of Fig. 2 to the free position of Fig. 3, it is necessary to rotate the locking-sleeve on the shaft 16 in the direction of rotation of the shaft. This is done manually by the attendant and practical experience has shown that it is impossible to do this so long as the shaft 16 continues to rotate. Thus the machine cannot be started until the safety cover is closed and the safety cover cannot be opened until the machine has come absolutely to rest.

The invention in its broader aspects is not limited to the specific mechanisms shown and described but departures may be made therefrom within the scope of the accompanying claims without departing from the principles of the invention and without sacrificing its chief advantages.

What we claim is:—

1. A centrifugal extractor including in combination a basket, a driving shaft, a safety cover, a safety lock including a member reciprocably movable with the cover and a member rotating continuously with the shaft and being rotatable in the same direction relatively thereto while the shaft is stationary, said two members mutually locking each other for preventing the starting of the driving shaft unless the cover has been closed, and for preventing the opening of the cover as long as the driving shaft continues to rotate.

2. A centrifugal extractor including in combination a basket, a driving shaft, a safety cover, a safety lock including a member reciprocably movable with the cover and a member mounted concentrically with and longitudinally movable on the shaft and rotating with it and being rotatable in the same direction relatively thereto only when the shaft is stationary, and controlling said first mentioned movable member.

3. A centrifugal extractor including in combination a basket, a driving shaft, a safety cover, a safety lock including a member reciprocably movable with the cover and a member rotating with the shaft and being rotatable through a limited arc in the same direction relatively thereto to pass out of the path of said first-mentioned member.

4. A centrifugal extractor including in combination a basket, a driving shaft, a safety cover, a safety lock including a member movable with the cover and a member rotating with the shaft and being rotatable in the same direction relatively thereto only when said shaft is stationary to pass out of the path of said first-mentioned member, and means cooperating with said rotatable member for preventing starting of the shaft while the cover is open.

5. In combination with a centrifugal machine, an element movable with the cover of the centrifugal and positionable in locking and non-locking positions, a rotatable member positively driven by the driving mechanism of the centrifugal and positionable in locking and non-locking positions, said element and said member mutually interengaging for preventing the starting of the machine unless the cover is closed and for preventing the opening of the cover until the machine has stopped.

6. In combination with a centrifugal machine, an element movable with the cover of the centrifugal and positionable in locking and non-locking positions, a member rotated by the driving mechanism of the centrifugal and positionable in locking and non-locking positions, said member being movable to unlocking position only when the driving mechanism is at rest by being rotated in the same direction that the driving mechanism is rotated, said element and said member mutually interengaging for preventing the starting of the machine unless the cover is closed and for preventing the opening of the cover until the machine has stopped.

7. In combination with a centrifugal machine, a shaft for driving the centrifugal, a locking member keyed to said shaft to rotate therewith and longitudinally movable thereon, a locking member connected to move with the cover of the centrifugal, said two locking members interengaging for mutually locking each other, for preventing the starting of the driving shaft when the cover is open, and for preventing the opening of the cover while the shaft is rotating.

8. In combination with a centrifugal machine, a driving shaft, a locking sleeve, means, including a key and a diagonal slot, for positioning the sleeve on the shaft, and a locking member movable with the cover of the centrifugal, the locking member preventing longitudinal movement of the sleeve on the shaft unless the cover is closed.

9. In combination with a centrifugal machine, a driving shaft, a locking sleeve, means including a key and a diagonal slot, for positioning the sleeve on the shaft and a locking member movable with the cover of the centrifugal, the locking sleeve and the locking member serving to lock each other for preventing the starting of the driving shaft unless the cover is closed and for preventing the opening of the cover unless rotation of the driving shaft has ceased.

10. In a centrifugal machine having a casing and rotatable basket, the combination of a safety cover, means for driving the basket, power-control means for regulating the driving means, including a belt-shift lever, means for locking the cover in closed position, and a longitudinally movable member controlled by the cover-locking means for blocking movement of the belt-shift lever.

11. In a centrifugal machine having a casing and rotatable basket, the combination of a safety cover, a shaft for driving the basket, power-control means therefor, an obstructor for preventing opening of the cover when the driving shaft is rotating regardless of the position of the power control means, said obstructor also operating to prevent application of power when the cover is open, and a member positively driven by the driving shaft for engaging the obstructor when the shaft is rotating.

12. In a centrifugal machine having a safety cover, a driving shaft for the basket having live and loose pulleys thereon, a belt shifter, an obstructor for preventing opening of the cover when the shaft is rotating regardless of the position of the belt shifter and positioned in the path of the belt shifter to prevent movement thereof to the live pulley when the cover is open, and a member positively driven by the driving shaft for engaging the obstructor when the shaft is rotating.

13. A centrifugal extractor including in combination a basket, a driving shaft, a safety cover, a safety lock including a member movable with the cover and means for preventing starting of the driving shaft until the safety cover has been closed comprising an obstructor mounted upon and rotating freely with the shaft in the path of said member, said obstructor being rotatable relatively to the shaft and in the same direction to pass out of the path of said member.

14. A centrifugal extractor including in combination a basket, a driving shaft, a safety cover and a safety lock including a member reciprocably movable with the cover and means for preventing starting of the driving shaft until the safety cover has been closed comprising an obstructor mounted upon and positively rotated by the shaft in the path of said member, said obstructor being rotatable relatively to the shaft and in the same direction to pass out of the path of said member.

In testimony whereof, we have signed our names to this specification.

TANDY A. BRYSON.
FRANK I. WILLIAMS.